US011967815B2

(12) United States Patent
Worden

(10) Patent No.: US 11,967,815 B2
(45) Date of Patent: Apr. 23, 2024

(54) CABLE HANGER

(71) Applicant: Gamechange Solar Corp., Norwalk, CT (US)

(72) Inventor: Andrew Barron Worden, Redding, CT (US)

(73) Assignee: Gamechange Solar Corp., Norwalk, CT (US)

(*) Notice: Subject to any disclaimer, the term of this patent is extended or adjusted under 35 U.S.C. 154(b) by 0 days.

(21) Appl. No.: 17/546,823

(22) Filed: Dec. 9, 2021

(65) Prior Publication Data

US 2022/0190577 A1 Jun. 16, 2022

Related U.S. Application Data

(60) Provisional application No. 63/124,413, filed on Dec. 11, 2020.

(51) Int. Cl.
| | |
|---|---|
| *H02G 3/30* | (2006.01) |
| *F16L 3/04* | (2006.01) |
| *H02G 3/32* | (2006.01) |
| *H02G 3/38* | (2006.01) |
| *F16L 3/02* | (2006.01) |
| *F16L 3/233* | (2006.01) |
| *H02G 7/00* | (2006.01) |

(52) U.S. Cl.
CPC ............... *H02G 3/28* (2013.01); *H02G 3/32* (2013.01); *F16L 3/02* (2013.01); *F16L 3/04* (2013.01); *F16L 3/233* (2013.01); *H02G 3/30* (2013.01); *H02G 7/00* (2013.01)

(58) Field of Classification Search
CPC .. H02G 3/28; H02G 3/32; H02G 3/30; H02G 3/263; H02G 7/08; H02G 3/0443; H02G 3/04; F16L 3/02; F16L 3/223
See application file for complete search history.

(56) References Cited

U.S. PATENT DOCUMENTS

| | | | | |
|---|---|---|---|---|
| 3,136,515 A | * | 6/1964 | Potruch | F16L 3/13 |
| | | | | 248/62 |
| 9,800,028 B1 | * | 10/2017 | Smith | H02G 3/30 |
| 2016/0153587 A1 | * | 6/2016 | Smith | H02G 3/30 |
| | | | | 29/515 |
| 2018/0233888 A1 | * | 8/2018 | Smith | F16L 3/02 |
| 2018/0347727 A1 | * | 12/2018 | Shea | H02G 3/0456 |

FOREIGN PATENT DOCUMENTS

GB  2605006 A  *  9/2022  ............... F16L 3/00

* cited by examiner

*Primary Examiner* — Tan Le
(74) *Attorney, Agent, or Firm* — O'Shea P.C.

(57) ABSTRACT

A hanger device comprises a plurality of cable supports, each comprising a parallel sidewall and a lateral shape retention sidewall where the parallel sidewalls and the lateral shape retention sidewall are separated by a wire engagement surface for holding one or more of the plurality of cables, where each of the lateral shape retention sidewalls includes a hook that comprises first and second hook sidewalls and a radiused surface that separates the first and second hook sidewalls, where each of the hooks opens in an exterior opposing direction; and a hanger surface that separates the parallel sidewalls, where the hanger device is hung on the hanger carrier by placing the hanger surface on the hanger carrier and the lateral shape retention sidewalls are pressed inwardly towards the parallel sidewalls and about the engagement surfaces so both hooks opposingly engage the cable.

9 Claims, 8 Drawing Sheets

CABLE HANGER

CROSS REFERENCE TO RELATED APPLICATIONS

This application claims the benefit of U.S. Provisional Patent Application Ser. No. 63/124,413 filed Dec. 11, 2020, which is hereby incorporated by reference.

BACKGROUND OF THE INVENTION

1. Technical Field

This disclosure relates generally to hangers, and more particularly to cable hangers.

2. Background Information

Cable hangers are known for suspending cables (e.g., power and data) from a messenger wire or other support. As utility scale solar plants have increased in scope there is a greater need to handling the increased number of cables that are suspended from the racking or tracker systems. There is a need for improved cable hangers, for example, for use in a system that includes an array of solar panels, for improved cable management.

SUMMARY OF THE DISCLOSURE

According to an aspect of the disclosure, a hanger device to be hung from a hanger carrier and for suspending a plurality of cables in horizontal and spaced relation to each other, comprises a plurality of cable supports, each comprising a parallel sidewall and a lateral shape retention sidewall where the parallel sidewalls and the lateral shape retention sidewall are separated by a wire engagement surface for holding one or more of the plurality of cables, where each of the lateral shape retention sidewalls includes a hook that comprises first and second hook sidewalls and a radiused surface that separates the first and second hook sidewalls, where each of the hooks opens in an exterior opposing direction; and a hanger surface that separates the parallel sidewalls, where the hanger device is hung on the hanger carrier by placing the hanger surface on the hanger carrier and the lateral shape retention sidewalls are pressed inwardly towards the parallel sidewalls and about the engagement surfaces so both hooks opposingly engage the cable.

The hanger surface may be radiused.

The hanger device may be formed as a single-piece unitary component.

The plurality of cable supports may include a first cable support that comprises a first parallel sidewall and a first lateral shape retention sidewall separated at distal end by a first cable support surface, and a second cable support that comprises a second parallel sidewall and a second lateral shape retention sidewall separated at the distal end by a second cable support surface, where the first and second parallel sidewalls are separated by the hanger surface at a proximate end.

The wire engagement surface may be a radiused surface.

The wire engagement surface may be a compound radiused surface.

The wire engagement surface may comprise radiused surface that separates first and second wire engagement sidewalls.

The hooks may be substantially J-shaped.

According to another aspect of the disclosure, a hanger device to be hung from a hanger carrier and for suspending a plurality of cables in horizontal and spaced relation to each other, the hanger device comprises a first cable support that includes a first parallel sidewall and a first lateral shape retention sidewall separated at distal end by a first cable support surface; a second cable support that includes a second parallel sidewall and a second lateral shape retention sidewall separated at the distal end by a second cable support surface, where the first and second parallel sidewalls are separated by a hanger surface that separates the first and second parallel sidewalls at a proximate end, where the hanger device is hung by placing the hanger surface on the hanger carrier; a third cable support, where the second cable support is located between the first and third cable supports; a first hook that extends from the first lateral shape retention sidewall; and a second hook that extends from the third cable support, where the first and second hooks each opens in an exterior opposing direction, where the hanger device is hung on the hanger carrier by placing the hanger surface on the hanger carrier and the first lateral shape retention sidewall and the second lateral shape retention sidewall are pressed inwardly towards the parallel sidewalls so the first and second hooks opposingly engage the carrier cable.

The hooks may be substantially J-shaped.

According to yet another aspect of the present disclosure, a hanger device to be hung from a hanger carrier and for suspending a plurality of cables in horizontal and spaced relation to each other, the hanger device comprises a first cable support that includes a first sidewall and a first lateral shape retention sidewall separated at distal end by a first cable support surface; a second cable support that includes a second sidewall and a third sidewall separated at distal end by a second cable support surface; a third cable support that includes a fourth sidewall and a second lateral shape retention sidewall separated at the distal end by a third cable support surface, where the third and fourth sidewalls are connected by a hanger surface that separates the third and fourth sidewalls at a proximate end, where the hanger device is hung by placing the hanger surface on the hanger carrier; a fourth cable support, where the second cable support is located between the first and third cable supports; a first hook that extends from the first lateral shape retention sidewall; and a second hook that extends from the fourth cable support, where the first and second hooks each opens in an exterior opposing direction, where the hanger device is hung on the hanger carrier by placing the hanger surface on the hanger carrier and the first lateral shape retention sidewall and the second lateral shape retention sidewall are pressed inwardly towards the first and second sidewalls so the first and second hooks opposingly engage the hanger carrier.

The foregoing features and the operation of the invention will become more apparent in light of the following description and the accompanying drawings.

DETAILED DESCRIPTION

Figure 1:
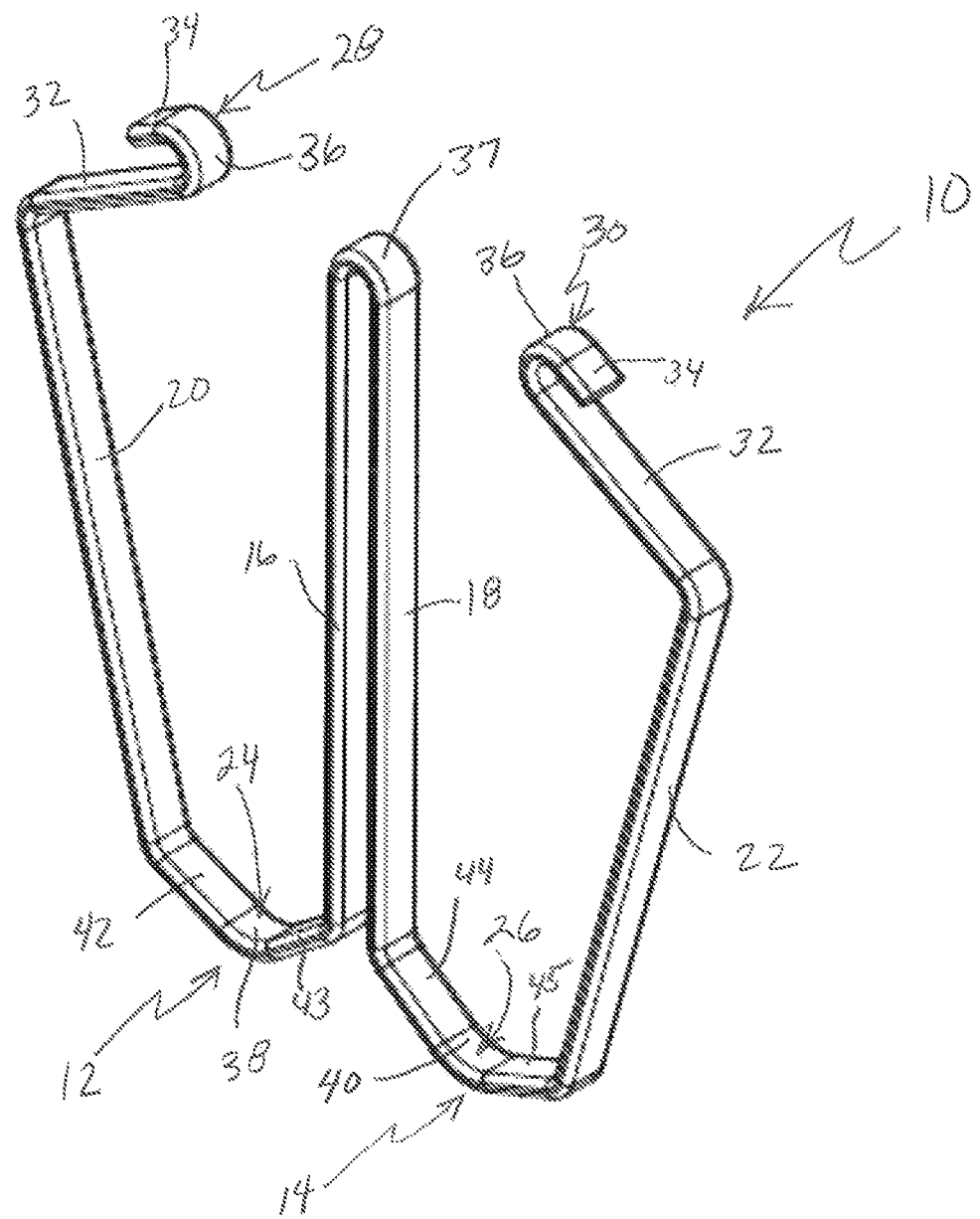
FIG. 1 illustrates a perspective view of a first exemplary embodiment of a hanger device.
Figure 2:
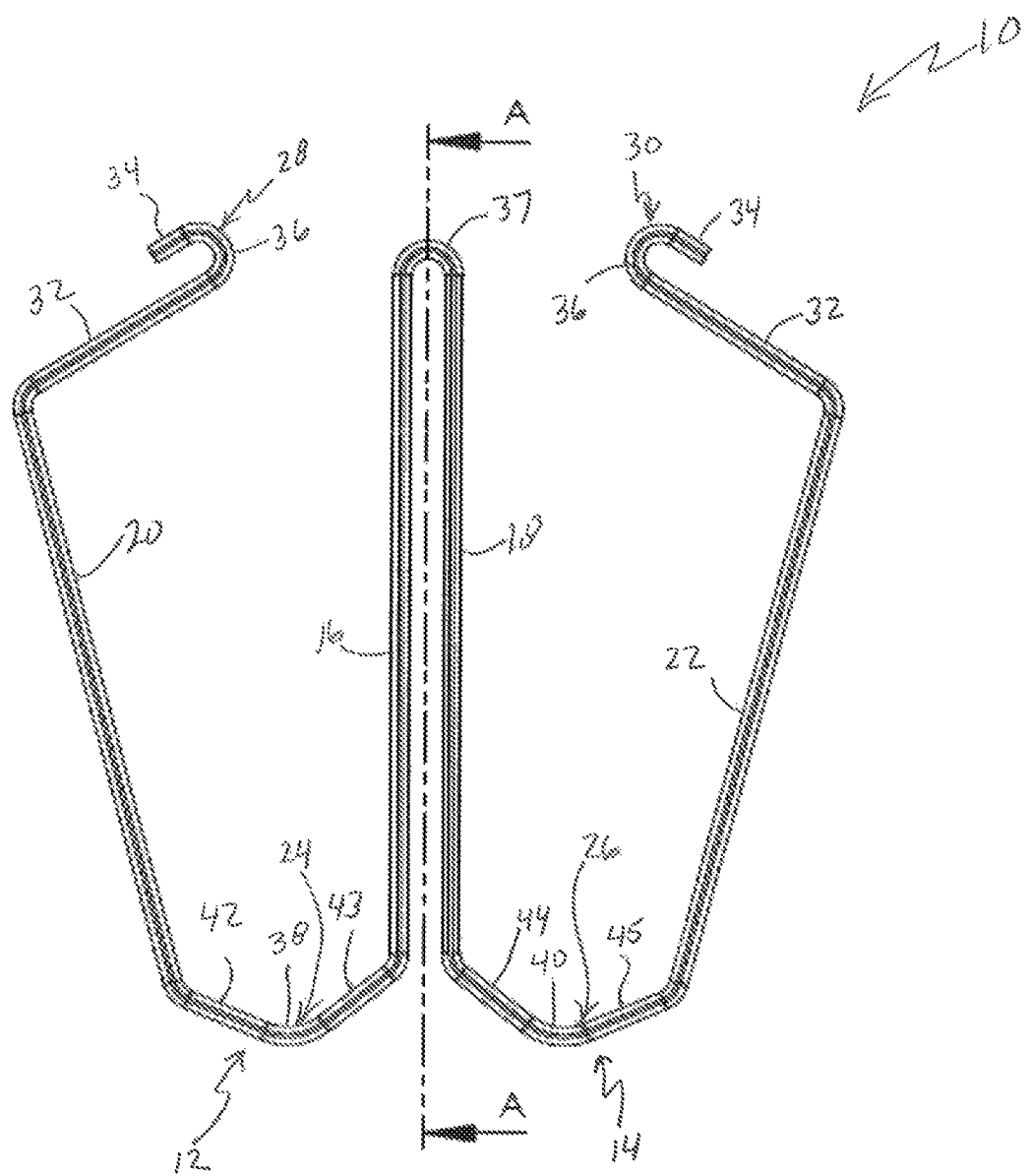
FIG. 2 illustrates a front view of the hanger device of FIG. 1.
Figure 3:
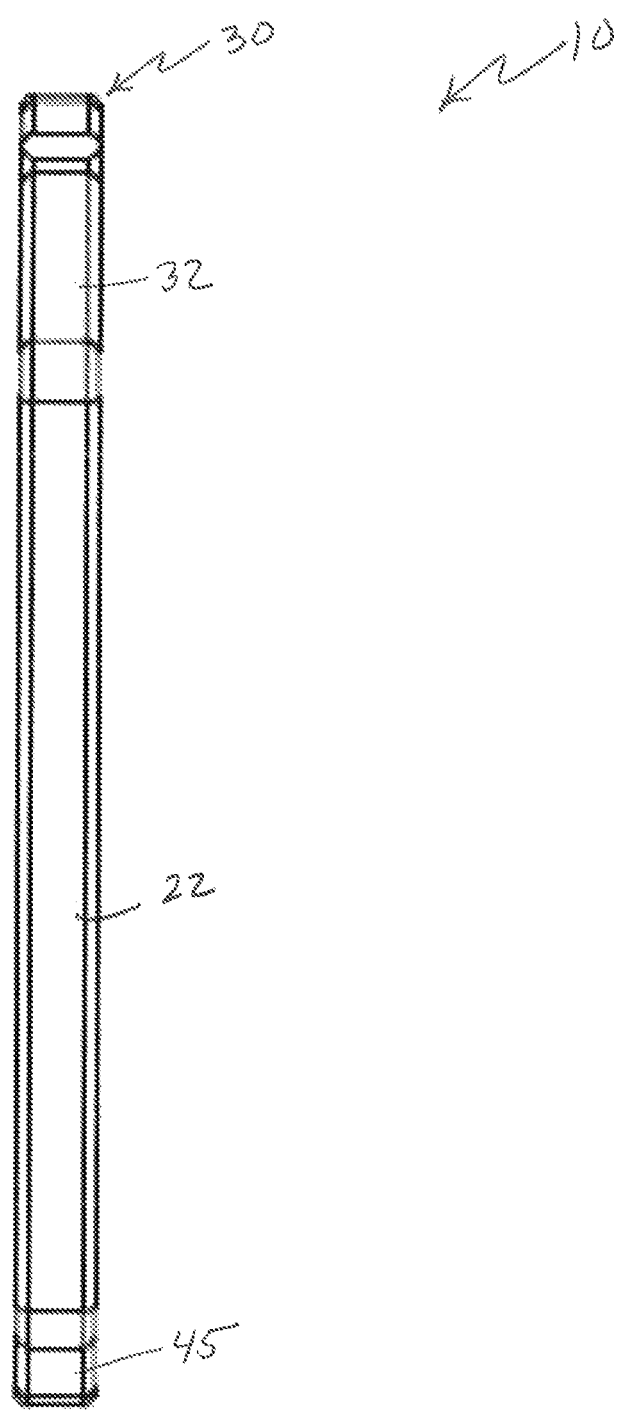
FIG. 3 illustrates a side view of the hanger device of FIGS. 1-2.

FIG. 1 illustrates a perspective view of a first exemplary embodiment of a hanger device 10. FIG. 2 illustrates a front view of the hanger device 10 of FIG. 1. FIG. 3 illustrates a side view of the hanger device 10 of FIGS. 1-2. Referring to FIGS. 1-3, the hanger device may be used to suspend a plurality of cables/wires (not shown) in horizontal and spaced relation to each other. The hanger device 10 includes a plurality of cable supports 12, 14, each comprising a parallel sidewall 16, 18, respectively, as well as a lateral shape retention sidewall 20, 22, respectively. The parallel sidewalls 16, 18 and the lateral shape retention sidewalls 20, 22 of each cable support 12, 14 are separated by a cable engagement surface 24, 26, respectively, that supports one or more of the plurality of cables/wires (not shown).

Each of the lateral shape retention sidewalls 20, 22 includes a hook 28, 30, respectively at an end thereof, that comprises first and second hook sidewalls 32, 34 and a radiused surface 36 that separates the first and second hook sidewalls 32, 34. Each of the hooks 28, 30 opens in a lateral exterior direction of the hanger device 10.

A radiused hanger end 37 separates the parallel sidewalls 16, 18, where the hanger device 10 is hung on a hanger carrier cable (e.g., a messenger cable) by placing the radiused hanger end 37 on the cable and the lateral shape retention sidewalls 20, 22 are pressed/bent inwardly about the cable engagement surfaces 24, 26, respectively, so both the hooks 28, 30 engage the hanger carrier cable (not shown). The hanger 10 provides a three-point engagement with the hanger carrier cable, since the cable supports the hanger at the radiused hanger end 37, and the hooks 28, 30 opposingly engage the cable.

The cable engagement surfaces 24, 26 may take on various shapes. As illustrated in FIGS. 1 and 2, the cable engagement surfaces 24, 26 may include a radiused surface 38, 40, respectively, and sidewalls 42-45 that connect the associated radiused surfaces 38, 40 to its respective one of the parallel sidewalls 16, 18 and to its respective one of the lateral shape retention sidewalls 20, 22. Alternatively, the cable engagement surfaces 24, 26 may be a single radiused surface, a compound radiused surface, or a combination of radiused segments and straight segments. In one embodiment the angle $\theta_1$ between the sidewalls 41, 42 may be about 120 degrees.

Figure 4:
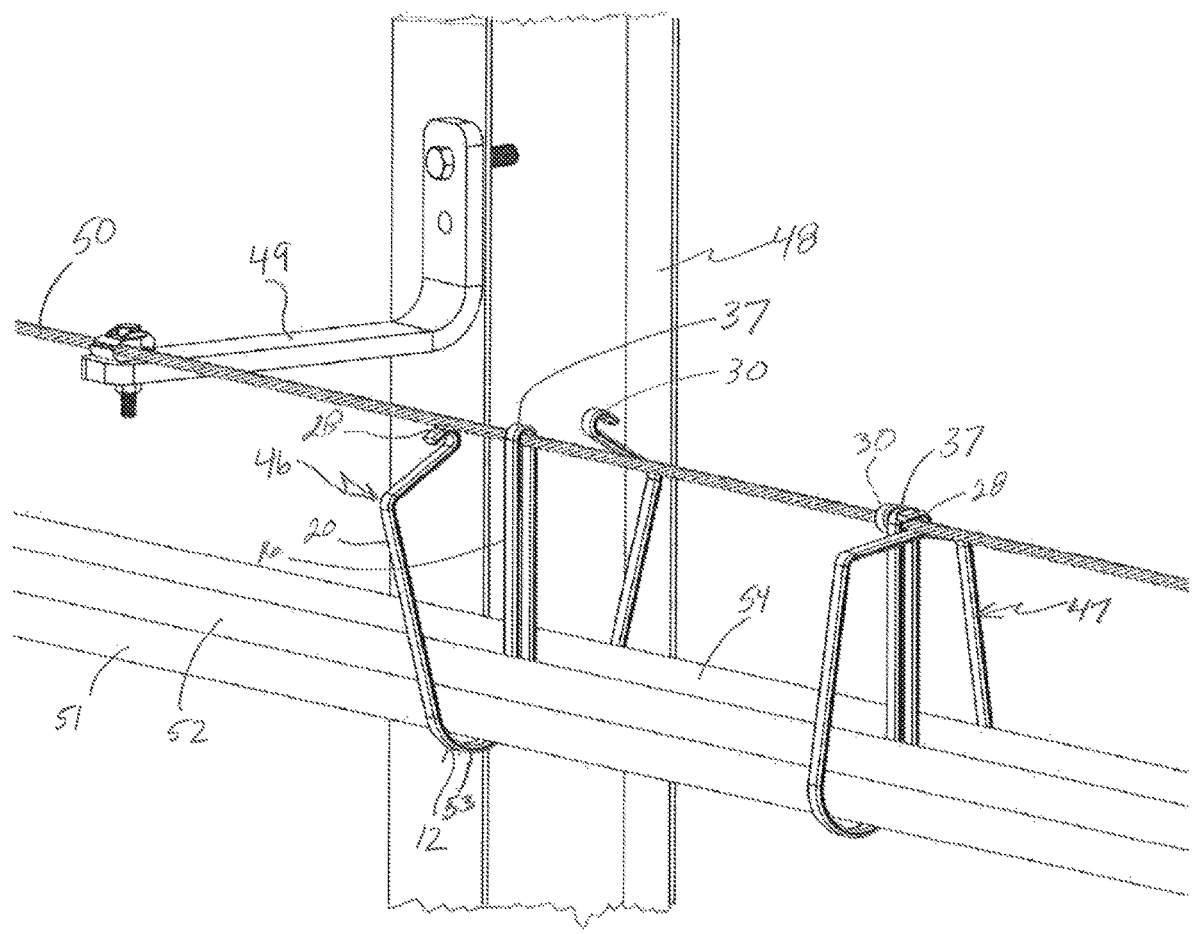
FIG. 4 is a pictorial illustration of first and second hangers hanging from a hanger carrier cable secured to a stationary structural member via a support bracket.

FIG. 4 is a pictorial illustration of first and second hangers 46, 47 hanging from a hanger carrier 50 (e.g., a cable) secured to a stationary structural member 48 via a support bracket 49. In some embodiments, one or more stationary structural members may be securely anchored to the ground. For example, a bottom portion of the member's 48 length may be buried in the ground and/or otherwise secured to or with a foundation, which may be a driven pile, helical screw, screw, precast or cast in place (e.g., Pour-in-Place™ installation system available from GameChange Solar Corp.) or any other foundation type. In other embodiments, one or more of the stationary structural members may be anchored to another structure such as, but not limited to, a building roof top. In one embodiment the stationary structural member 48 may be part of a solar panel racking assembly.

Referring still to FIG. 4, a support bracket 49 (e.g., L-shaped) is fastened at a first end to the stationary structural member 48 and at a second end to a carrier wire 50. The first hanger 46 is operably secured to the hanger carrier cable 50 by hanging the radiused hanger end 37 on the carrier wire 50. One or more cables 51-52 to be carried by the first cable support 12 are lowered to rest upon first cable engagement surface 53. In this embodiment the first engagement surface 53 is a single radiused surface located between the first parallel sidewall 16 and the first lateral shape retention sidewall 20. With the one or more cables 51-52 positioned on the first engagement surface 53, the first lateral shape retention sidewall 20 is pushed inward so the first hook 28 engages the carrier cable 50. The process may be repeated for cable 54 to carried within the second cable support 14. The second hanger 47 is shown in its operably secured position with its radiused hanger end 37 on the carrier wire 50 and the first and second hooks 28, 30 opposingly engaged about the carrier cable 50.

The present disclosure is of course not limited to two cable supports 12, 14 as illustrated in an exemplary embodiment in FIGS. 1-4. A hanger of the present disclosure may be configured to support a plurality of cables via a plurality of supports. For example, in another embodiment FIG. 5 illustrates a perspective view of a second exemplary embodiment of a hanger device 55.

Figure 5:
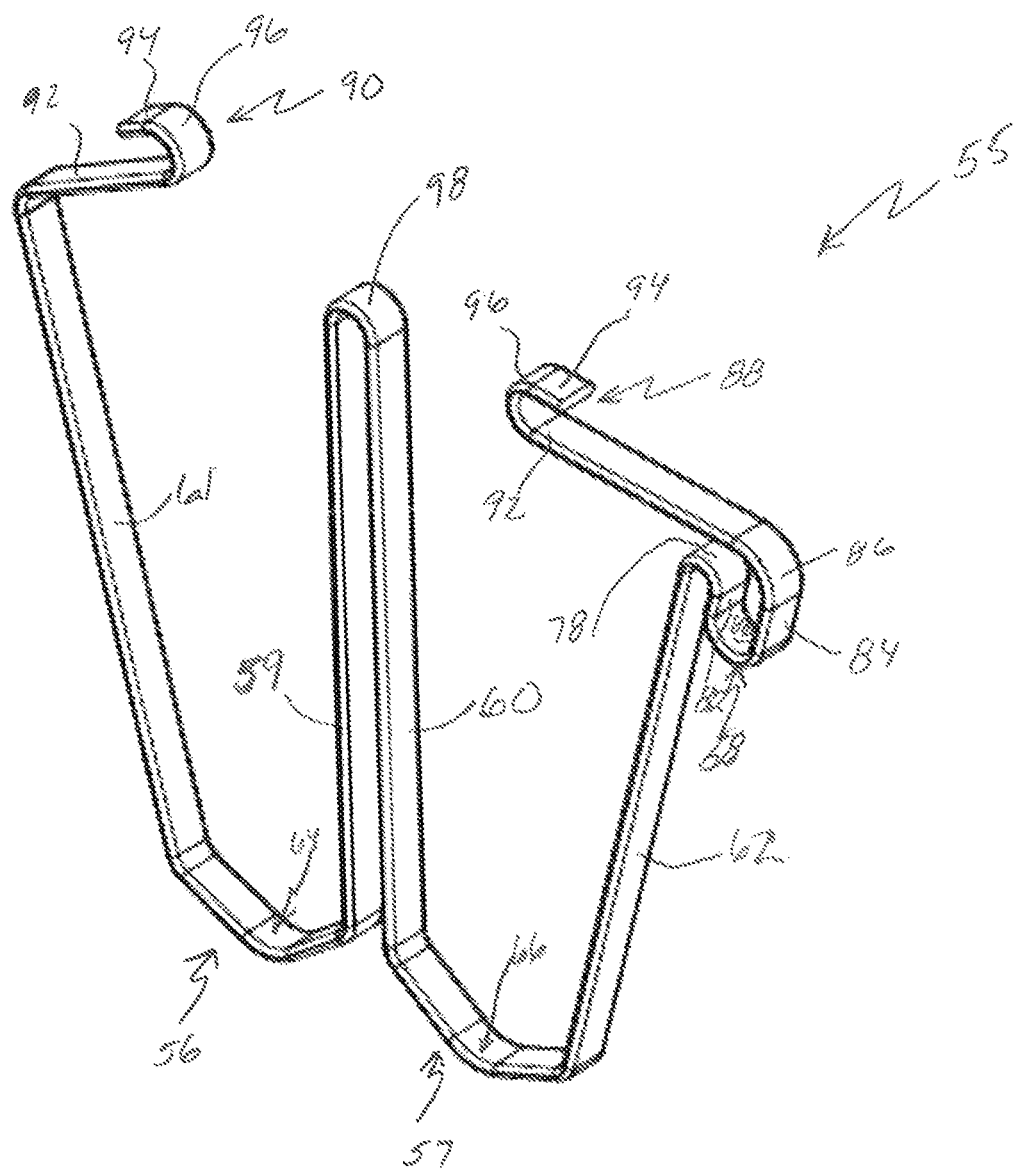
FIG. 5 illustrates a perspective view of a second exemplary embodiment of a hanger device.
Figure 6:
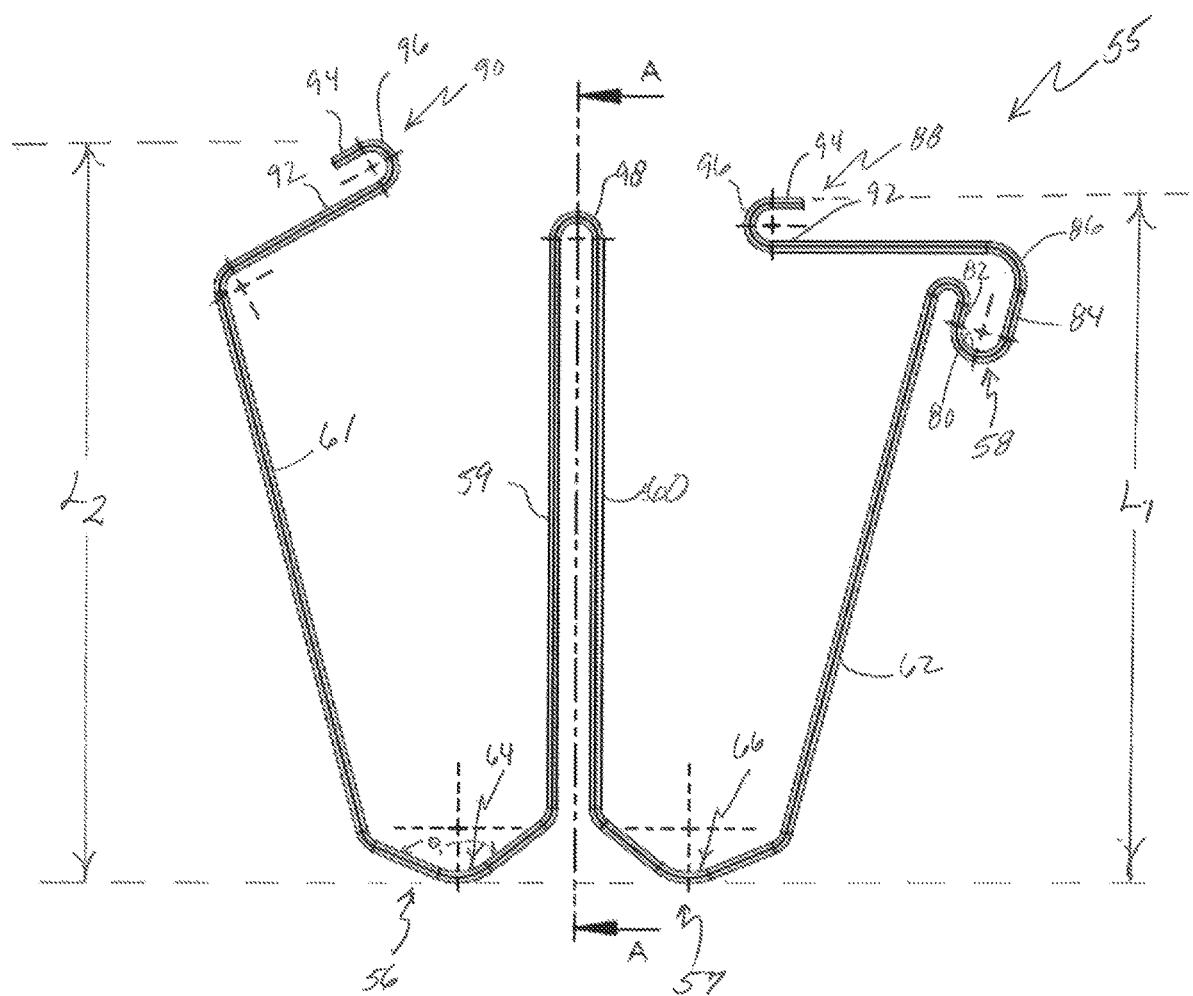
FIG. 6 illustrates a front view of the hanger device of FIG. 5.

Referring to FIGS. 5-6, in this embodiment the hanger device 55 includes first, second and third cable supports 56-58 that support wires/cables (not shown). The first and second cable supports 56-57 each comprise a parallel sidewall 59, 60 respectively, as well as a lateral shape retention sidewall 61, 62, respectively. The parallel sidewalls 59, 60 and the lateral shape retention sidewalls 61, 62 of each cable support 56, 57 are separated by a first and second wire engagement surfaces 64, 66, respectively, that support one or more of the plurality of cables (e.g., 51, 52 and 54).

At a distal end of the second lateral shape retention sidewall 62 is a radiused edge 78 that transitions to the third cable support 58. The support 58 includes a cable support surface 80 that separates first and second sidewalls 82, 84. A radiused edge 86 transitions from the third cable support 58 to a first hook 88. A second hook 90 is located at a distal end of the first lateral shape retention sidewall 61. The first and second hooks 88, 90 each first and second hook sidewalls 92, 94 and a radiused surface 96 that separates the sidewalls 92, 94. Each of the hooks 88, 90 opens in a lateral exterior direction of the hanger device 55.

A radiused hanger end 98 separates the parallel sidewalls 59, 60, where the hanger device 55 is hung on a hanger carrier cable (e.g., a messenger cable/wire) by placing the radiused hanger end 98 on the cable and the lateral shape retention sidewalls 61, 62 are pressed/bent inwardly about the first and second cable supports 56, 57, so both the hooks 88, 90 engage the cable (not shown).

Notably, the hanger 55 provides a three-point engagement with the hanger carrier cable, since the cable supports the hanger at the radiused hanger end 98, and engages the opposing hooks 88, 90.

The height of the sidewalls 62, 82 separating the engagement surfaces 57, 58 is selected to merely separate the cables being carried by the respectively engagement surfaces 57, 58. While the parallel sidewalls 59, 60 that engage the radiused surface 98 from which the hanger 55 is hung have a height that compliments the engagement of the radiused surface 98 and the hooks 88, 90 with the cable 50.

Referring to FIG. 6, distal end of the first hook 88 is length $L_1$ away from proximate end of the hanger 55, and distal end of the second hook 90 is length $L_2$ away from proximate end of the hanger 55. In this embodiment $L_2$ is greater than $L_1$. In addition, the first lateral shape retention sidewall 61 is connected to the hook 90 via the sidewall 92, where the first lateral shape retention sidewall 61 and the sidewall 92 are substantially perpendicular. However, it is contemplated that rather than substantially perpendicular the angle between the sidewalls 61, 92 may be acute or obtuse.

Figure 7:
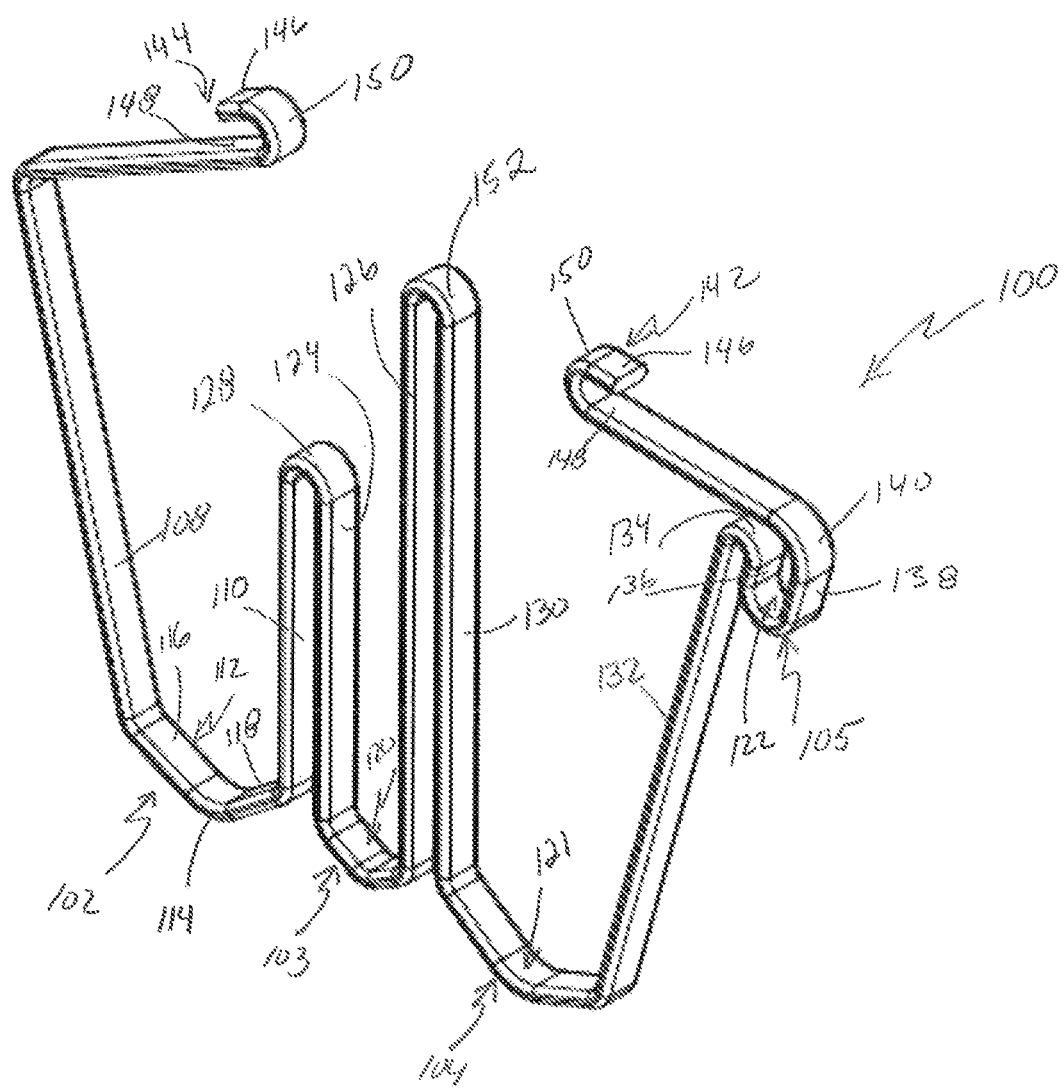
FIG. 7 illustrates a perspective view of a third exemplary embodiment of a hanger device.
Figure 8:
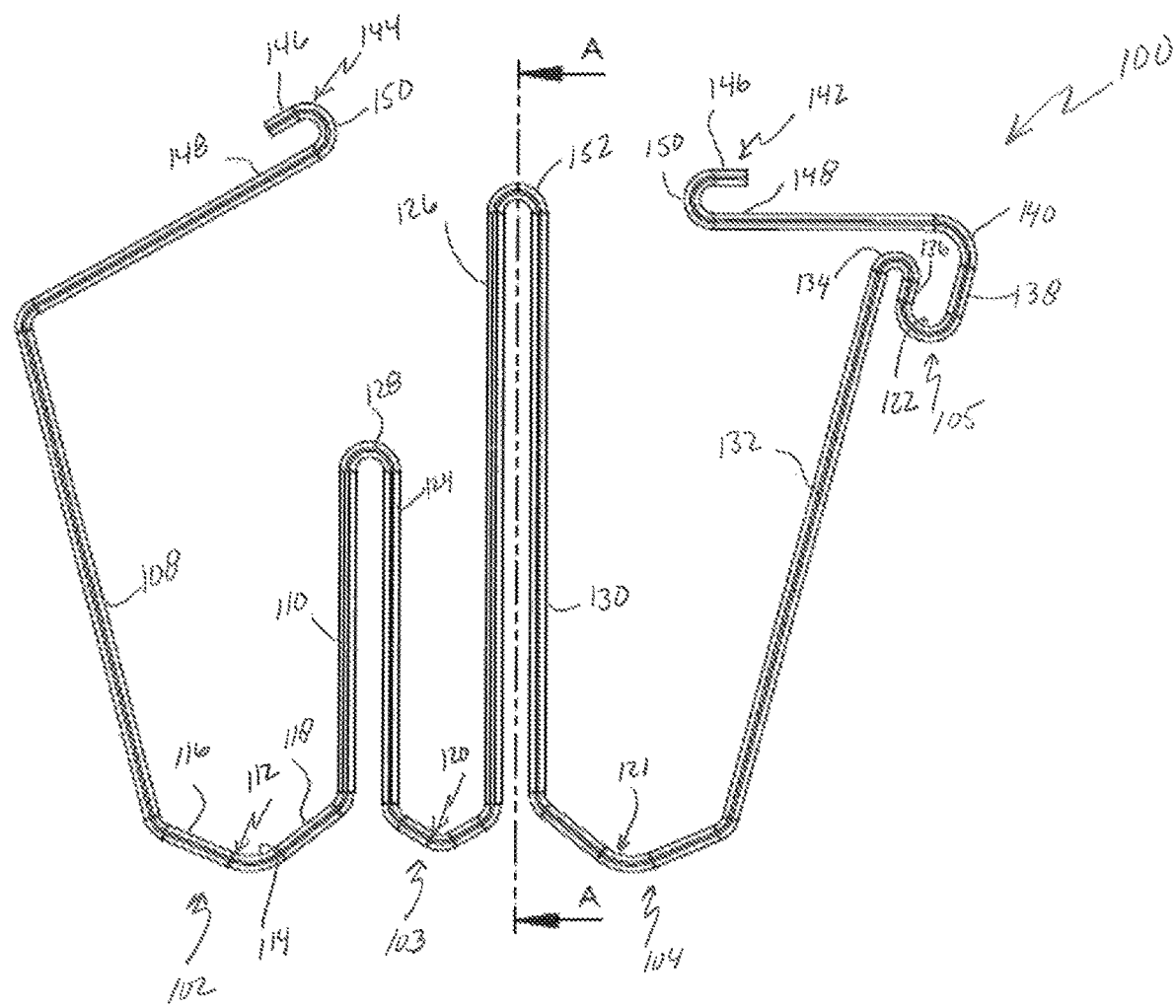
FIG. 8 illustrates a front view of the hanger device of FIG. 7.

In still yet another embodiment FIG. 7 illustrates a perspective view of a third exemplary embodiment of a hanger device 100. FIG. 8 illustrates a front view of the hanger device 100 of FIG. 8. This embodiment is substantially the same as the embodiment illustrated in FIGS. 5-6, with the principal exception that this embodiment provides four cable supports 102-105 that support wires/cables (not shown), in contrast to the embodiment in FIGS. 5-6 that provides three cable supports 56-58. Referring now FIGS. 7-8, in this embodiment the hanger device 100 includes first, second, third and fourth cable supports 102-105 that support wires/cables (not shown). The first cable support 102 includes shape retention sidewall 108, parallel sidewall 110 and first engagement surface 112 that separates sidewalls 108, 110. The first engagement surface 112 may include a radiused edge 114 that separates first and second engagement surfaces 116, 118 that engage the shape retention sidewall 108 and parallel sidewall 110, respectively. Second, third and fourth engagement surfaces 120-122 of the second, third and fourth cable supports 102-105 may be similarly configured.

The second cable support 103 includes parallel sidewalls 124, 126. Parallel sidewalls 110 and 124 are separated by a radiused edge 128. The third cable support 104 includes a parallel sidewall 130 and lateral shape retention sidewall 132, which are separated by the third engagement surface 121.

At a distal end of the lateral shape retention sidewall 132 is a radiused edge 134 that transitions to the fourth cable support 105. The fourth cable support 105 includes the fourth engagement surface 122 that separates first and second sidewalls 136, 138. A radiused edge 140 transitions from the fourth cable support 105 to a first hook 142. A second hook 144 is located at distal end of the first lateral shape retention sidewall 108. The first and second opposing hooks 142, 144 each include and second hook sidewalls 146, 148 and a radiused surface 150 that separates the sidewalls 146, 148. Each of the hooks 142, 144 opens in a lateral exterior direction of the hanger device 100.

A radiused hanger end 152 separates the parallel sidewalls 126, 130, where the hanger device 100 is hung on a cable (e.g., a messenger cable) by placing the radiused hanger end 152 on the cable and the lateral shape retention sidewalls 108, 132 are bent inwardly about the first and third cable supports 102, 104, so both the hooks 142, 144 engage the cable (not shown). The hanger 100 provides a three-point engagement with the cable, since the cable supports the hanger at the radiused hanger end 152, and engages the hooks 142, 144.

As discussed above, the wire engagement surfaces may be configured in various ways, including for example a single radiused surface, a compound radiused surface, or a combination of radiused segments and straight segments.

The hanger embodiments disclosed herein may be configured as a single-piece unitary component (e.g., metallic, plastic coated metal, hot rolled commercial steel coated with polypropylene, etc.).

Although the embodiments in FIGS. 1-8 illustrate the hanger having generally a rectilinear cross section with radiused edges, the hanger of the present disclosure is not so limited and may take on many different cross sections. For example, the hanger may be formed from coated round wire and as a result the hanger elements have a round cross section. The hanger devices disclosed herein may be a plastic-coated spring wire component, but one of ordinary skill will recognize that the hanger device embodiments disclosed herein are not so limited to plastic-coated spring wire.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A hanger device to be hung from a hanger carrier and for suspending a plurality of cables in horizontal and spaced relation to each other, the hanger device comprising:
   a plurality of cable supports, each comprising a parallel sidewall and a lateral shape retention sidewall where the parallel sidewalls and the lateral shape retention sidewall are separated by a wire engagement surface for holding one or more of the plurality of cables, where each of the lateral shape retention sidewalls includes a hook that comprises first and second hook sidewalls and a radiused surface that separates the first and second hook sidewalls, where each of the hooks opens in an exterior opposing direction; and
   a hanger surface that separates the parallel sidewalls, where the hanger device is hung on the hanger carrier by placing the hanger surface on the hanger carrier and the lateral shape retention sidewalls are pressed inwardly towards the parallel sidewalls and about the engagement surfaces so both hooks opposingly engage the hanger carrier.

2. The hanger device of claim 1 where the hanger surface is radiused.

3. The hanger device of claim 1 where the hanger device is formed as a single-piece unitary component.

4. The hanger device of claim 1 where the plurality of cable supports includes a first cable support that comprises a first parallel sidewall and a first lateral shape retention sidewall separated at distal end by a first cable support surface, and a second cable support that comprises a second parallel sidewall and a second lateral shape retention sidewall separated at the distal end by a second cable support surface, where the first and second parallel sidewalls are separated by the hanger surface at a proximate end.

5. The hanger device of claim 1 where the wire engagement surface is a radiused surface.

6. The hanger device of claim 1 where the wire engagement surface is a compound radiused surface.

7. The hanger device of claim 1 where the wire engagement surface comprises a radiused surface that separates first and second wire engagement sidewalls.

8. The hanger device of claim 1 where the hooks are substantially J-shaped.

9. The hanger device of claim 1, where the parallel sides each have a length such that the wire engagement surface and the first and second hooks are substantially adjacent and the wire engagement surface is between the first and second hooks.

* * * * *